US010836313B2

(12) United States Patent
Nowakowski et al.

(10) Patent No.: US 10,836,313 B2
(45) Date of Patent: Nov. 17, 2020

(54) MIXED REALITY VIEW FOR ENHANCING PEDESTRIAN SAFETY

(71) Applicant: Valeo Comfort and Driving Assistance, Creteil (FR)

(72) Inventors: Christopher Steven Nowakowski, San Francisco, CA (US); David Saul Hermina Martinez, San Mateo, CA (US); Delbert Bramlett Boone, II, Redwood City, CA (US); Eugenia Yi Jen Leu, San Mateo, CA (US); Mohamed Amr Mohamed Nader Abuelfoutouh, San Mateo, CA (US); Sonam Negi, Sunnyvale, CA (US); Tung Ngoc Truong, San Jose, CA (US)

(73) Assignee: Valeo Comfort and Driving Assistance (FR)

( * ) Notice: Subject to any disclaimer, the term of this patent is extended or adjusted under 35 U.S.C. 154(b) by 0 days.

(21) Appl. No.: 16/203,493

(22) Filed: Nov. 28, 2018

(65) Prior Publication Data
US 2020/0164799 A1    May 28, 2020

(51) Int. Cl.
*B60R 1/00*        (2006.01)
(52) U.S. Cl.
CPC .......... *B60R 1/00* (2013.01); *B60R 2300/304* (2013.01); *B60R 2300/8033* (2013.01)
(58) Field of Classification Search
None
See application file for complete search history.

(56) References Cited

U.S. PATENT DOCUMENTS 8,368,755 B2 * 2/2013 Nishida ................. G08G 1/162
340/435
8,412,413 B1    4/2013 Stark et al.
(Continued)

OTHER PUBLICATIONS

Broadcasting System "Transparentius", Art Lebedev Design Studio, Transport Trucks Show the Road Ahead, Available online at: https://www.artlebedev.ru/transparentius/, Dec. 21, 2009 [retrieved on Oct. 3, 2018], 3 pages.

(Continued)

*Primary Examiner* — Lindsay J Uhl
(74) *Attorney, Agent, or Firm* — Weaver Austin Villeneuve & Sampson LLP

(57) ABSTRACT

Methods, apparatuses, and computer-readable media are disclosed for providing a mixed-reality scene. In response to a pedestrian detection event at a first vehicle, a sequence of mixed-reality images is presented to a driver of a second vehicle. At least one image in the sequence of mixed-reality images results from merging (a) an image captured by a camera aboard the first vehicle and (b) an image captured by a camera aboard the second vehicle. The merging may comprise de-emphasizing an occluded portion of the image captured by the camera aboard the second vehicle and emphasizing an unoccluded portion of the image captured by the camera aboard the first vehicle. The unoccluded portion of the image captured by the camera aboard the first vehicle may provide, in the merged image, visibility of a pedestrian at least partially blocked from a view of the driver of the second vehicle.

14 Claims, 7 Drawing Sheets

(56) References Cited

U.S. PATENT DOCUMENTS

| | | | |
|---|---|---|---|
| 8,744,666 | B2 | 6/2014 | Switkes et al. |
| 8,947,219 | B2 | 2/2015 | Popovic |
| 9,043,483 | B2 | 5/2015 | Grigsby et al. |
| 9,165,198 | B2 | 10/2015 | Siegel et al. |
| 9,403,482 | B2 | 8/2016 | Shahraray et al. |
| 9,713,956 | B2 | 7/2017 | Bark et al. |
| 9,858,817 | B1 | 1/2018 | Bletzer et al. |
| 10,332,292 | B1 * | 6/2019 | Arnicar ............... G06K 9/00791 |
| 10,607,416 | B2 | 3/2020 | Nowakowski et al. |
| 2009/0231431 | A1 | 9/2009 | Grigsby et al. |
| 2010/0253539 | A1 | 10/2010 | Seder et al. |
| 2012/0268262 | A1 | 10/2012 | Popovic |
| 2014/0063064 | A1 | 3/2014 | Seo et al. |
| 2014/0333729 | A1 | 11/2014 | Pflug |
| 2016/0054735 | A1 | 2/2016 | Switkes et al. |
| 2016/0277601 | A1 | 9/2016 | Seymour |
| 2017/0200197 | A1 | 7/2017 | Brubaker |
| 2018/0101736 | A1 * | 4/2018 | Han ..................... G08G 1/0962 |
| 2018/0186290 | A1 | 7/2018 | Ward et al. |
| 2018/0236939 | A1 | 8/2018 | Smith |
| 2019/0005726 | A1 | 1/2019 | Nakano et al. |
| 2019/0051030 | A1 | 2/2019 | Choi et al. |
| 2019/0052842 | A1 | 2/2019 | Du et al. |
| 2019/0088142 | A1 | 3/2019 | Kotteri et al. |
| 2019/0164430 | A1 | 5/2019 | Nix |
| 2020/0086789 | A1 | 3/2020 | Nowakowski et al. |

OTHER PUBLICATIONS

Hawk Beacon, Wikipedia, Available online at: https://en.wikipedia.org/wiki/HAWK_beacon, Jul. 15, 2018 [retrieved on Oct. 4, 2018], 3 pages.

Neavia Unveils World's First V2X Pedestrian Warning Solution, Neavia Technologies, Available online at: http://www.neavia.c,om/2016-11-neavia-unveils-worlds-first-v2x-pedestrian-warning-solution/?lang=en, Oct. 27, 2016 [retrieved on Oct. 4, 2018], 3 pages.

Signalized Intersections: Informational Guide, (FHWA-HRT-04-091), Federal Highway Administration, U.S. Department of Transportation, Available online at: https://www.fhwa.dot.gov/publications/research/safety/04091/, Aug. 2004 [retrieved on Oct. 4, 2018], 18 pages.

Tapco LaneLight In-Road Warning Lights, in Pavement LED Crosswalk Lighting Markers, Tapco Traffic & Parking Control Co., Inc., Tapco, Safe Travels, Available online at: https://www.tapconet.com/solar-led-division/in-road-warning-lights, Accessed from Internet on Oct. 4, 2018, 2 pages.

The Safety Truck Could Revolutionize Road Safety, Samsung Press Release, Available online at: https://news.samsung.com/global/the-safety-truck-could-revolutionize-road-safety, Jun. 18, 2015 [retrieved on Oct. 3, 2018], 3 pages.

Urban Street Design Guide, National Association of City Transportation Officials, Available online at: https://nacto.org/publication/urban-street-design-guide/, 2013 [retrieved on Oct. 3, 2018], 8 pages.

Bougler et al., Investigation of Elderly Driver Safety and Comfort: In-Vehicle Intersection "Gap Acceptance Advisor" and Identifying Older Driver Needs, California PATH Research Report, UCB-ITS-PRR-2005-36, Available online at: https://merritt.cdlib.org/d/ark%3A%2F13030%2Fm5kh0pfx/2/producer%2FPRR-2005-36.pdf, Nov. 2005, 163 pages.

Bougler et al., California Intersection Decision Support: A Driver-Centered Approach to Left-Turn Collision Avoidance System Design, California PATH Research Report, UCB-ITS-PRR-2008-1, Jan. 2008, 106 pages.

Chan et al., California Intersection Decision Support: A Systems Approach to Achieve Nationally Interoperable Solutions, UCB-ITS-PRR-2005-11, California PATH Research Report, Apr. 2005, 212 pages.

Chen et al., Evaluation Methods and Results of the Intersafe Intersection Assistants, in 2007 IEEE Intelligent Vehicles Symposium, Available online at : https://doi.org/10.1109/IVS.2007.4290105, Jul. 2007, pp. 142-147.

Chen et al., Integrating Dashcam Views through Inter-Video Mapping, 2015 IEEE International Conference on Computer Vision (ICCV), Available online at: http://doi.org/10.1109/ICCV.2015.356, Dec. 2015, pp. 3110-3118.

Cody et al., Observation of Gap Acceptance During Intersection Approach, Proceedings of the Fourth International Driving Symposium on Human Factors in Driver Assessment, Training and Vehicle Design, Available online at: https://doi.org/10.17077/drivingassessment.1256, Jul. 2007, pp. 321-327.

Coxworth, See-through System Turns View-blocking Vehicles Transparent, New Atlas, Available online at: https://newatlas.com/see-through-system/29446/, Oct. 18, 2013 [retrieved on Oct. 3, 2018], 2 pages.

Gelbal et al., Elastic Band Based Pedestrian Collision Avoidance Using V2X Communication, 2017 IEEE Intelligent Vehicles Symposium (IV), Jun. 2017, pp. 270-276.

Gomes et al., Making Vehicles Transparent Through V2V Video Streaming, IEEE Transactions on Intelligent Transportation Systems, vol. 13, Issue 2, Available online at: http://doi.org/10.1109/TITS.2012.2188289, Jun. 2012, pp. 930-938.

Gomes et al., The See-through System: From Implementation to Test-drive, in 2012 IEEE Vehicular Networking Conference (VNC), Available online at: http://doi.org/10.1109/VNC.2012.6407443, Nov. 2012, pp. 40-47.

Judvaitis et al., Object Transparent Vision Combining Multiple Images from Different Views, Automatic Control and Computer Sciences, vol. 49, Issue 5, Sep. 2015, pp. 313-320.

Judvaitis et al., Improving Object Transparent Vision Using Enhanced Image Selection, Automatic Control and Computer Sciences, vol. 49, Issue 6, Nov. 2015, pp. 380-389.

Li et al., Multi-Vehicle Cooperative Perception and Augmented Reality for Driver Assistance: A Possibility to "see" Through Front Vehicle, 2011 14th International IEEE Conference on Intelligent Transportation Systems (ITSC), Available online at: http://doi.org/10.1109/ITSC.2011.6083061, Oct. 2011, pp. 242-247.

Misener et al., California Intersection Decision Support: A Systems Approach to Achieve Nationally Interoperable Solutions II, California PATH Research Report, UCB-ITS-PRR-2007-1, Available online at: https://merritt.cdlib.org/d/ark:%252F13030%252Fm56m37xk/3/producer%252FUCB-ITS-PRR-2007-1.pdf, Jan. 2007, 335 pages.

Misener et al., Cooperative Intersection Collision Avoidance System (CICAS): Signalized Left Turn Assist and Traffic Signal Adaptation, California PATH Research Report, UCB-ITS-PRR-2010-20, Apr. 2010, 246 pages.

Mortensen, FTA Office of Research, Demonstration and Innovation Safety Pilot Model Deployment—Transit, presented at U.S. DOT Connected Vehicle 2013 Public Meeting, RITA Research and Innovation Technology Administration, U.S. Department of Transportation, Sep. 24, 2013, 12 pages.

Naughton, Bosch System Can Warn Drivers of Unseen Hazards, the Detroit News, Available online at: https://www.detroitnews.com/story/business/autos/2018/06/05/bosch-develops-driver-warning-system/671125002/, Jun. 5, 2018, 2 pages.

Nowakowski, A Preliminary Evaluation of a Driver-Infrastructure Interface for a Left-Turn Warning, Proceedings of the Human Factors and Ergonomics Society Annual Meeting, vol. 50, Issue 22, Available online at: https://doi.org/10.1177/154193120605002222, Oct. 1, 2006, pp. 2453-2457.

Nowakowski et al., Comparison of Infrastructure and In-Vehicle Driver Interfaces for Left-Turn Warnings, Transportation Research Record: Journal of the Transportation Research Board, vol. 2069, No. 1, Available online at: https://doi.org/10.3141/2069-05, Jan. 1, 2008, pp. 33-40.

Olaverri-Monreal et al., The See-through System: A Vanet-enabled Assistant for Overtaking Maneuvers, in 2010 IEEE Intelligent Vehicles Symposium, Available online at: http://doi.org/10.1109/IVS.2010.5548020, Jun. 2010, pp. 123-128.

Rameau et al., A Real-Time Augmented Reality System to See-Through Cars, IEEE Transactions on Visualization and Computer Graphics, vol. 22, Issue 11, Available online at: http://doi.org/10.1109/TVCG.2016.2593768, Jul. 27, 2016, pp. 2395-2404.

(56) References Cited

OTHER PUBLICATIONS

Rusch et al., Augmented Reality Cues to Assist Older Drivers with Gap Estimation for Left-turns, Accident Analysis & Prevention, vol. 71, Available online at: https://doi.org/10.1016/J.AAP.2014.05.020, Oct. 2014, pp. 210-221.

Zennaro et al., A 'State Map' Architecture for Safe Intelligent Intersections, in ITS America 2003 13th Annual Meeting, Available online at: https://pdfs.semanticscholar.org/3a4e/c2ba404884ce0d8c1a46d690147865cad566.pdf, 2003, 12 pages.

"Valeo XtraVue, See Through Cars", YouTube, Available Online at: https://www.youtube.com/watch?v=F4-wWfCcyK4, Jul. 20, 2018, 1 page.

International Search Report and Written Opinion—PCT/EP2019/071060—ISA/EPO—Oct. 29, 2019, 13 pages.

Rameau et al., "A Real-Time Vehicular Vision System to Seamlessly See-Through Cars", International Conference on Computer Analysis of Images and Patterns, Nov. 3, 2016, pp. 209-222.

Thompson et al., "Enhancing Driver Awareness Using See-Through Technology", SAE Technical Paper Series, vol. 1, Apr. 3, 2018, 9 pages.

Yuan et al., "A Lightweight Augmented Reality System to See-Through Cars", 7th International Congress on Advanced Applied Informatics, Jul. 8, 2018, pp. 855-860.

U.S. Appl. No. 16/118,018, "Notice of Allowance" dated Nov. 21, 2019, 9 pages.

Takai et al., "Optical Vehicle-to-Vehicle Communication System Using LED Transmitter and Camera Receiver", IEEE Photonics Journal, vol. 6, No. 5, Oct. 2014, pp. 1-14.

U.S. Appl. No. 16/118,018, "Non-Final Office Action", dated May 30, 2019, 15 pages.

U.S. Appl. No. 16/118,018, "Corrected Notice of Allowability", dated Jan. 31, 2020, 2 pages.

U.S. Appl. No. 16/130,750, "Non-Final Office Action", dated Jan. 27, 2020, 12 pages.

\* cited by examiner

600

---

602 — at the second vehicle, in response to a pedestrian detection event at the first vehicle, presenting a sequence of mixed-reality images to a driver of the second vehicle, wherein at least one image in the sequence of mixed-reality images results from merging (a) an image captured by a camera aboard the first vehicle and (b) an image captured by a camera aboard the second vehicle, to generate a merged image 604 — wherein the merging comprises de-emphasizing an occluded portion of the image captured by the camera aboard the second vehicle, the occluded portion corresponding to occlusion by the first vehicle, and emphasizing an unoccluded portion of the image captured by the camera aboard the first vehicle 606 — wherein the unoccluded portion of the image captured by the camera aboard the first vehicle provides, in the merged image, visibility of a pedestrian at least partially blocked from a view of the driver of the second vehicle

FIG. 6

MIXED REALITY VIEW FOR ENHANCING PEDESTRIAN SAFETY

BACKGROUND

Aspects of the disclosure relate to enhancing safety for pedestrians in the context of vehicular traffic. Roadways are commonly shared between vehicles and pedestrians. Traditionally, infrastructure features such as crosswalks and signal lights have been implemented to protect pedestrians from vehicles. However, such infrastructure features do not always adequately ensure the safety of pedestrians. Oftentimes, drivers of vehicles do not pay sufficient attention to features such as crosswalks or signal lights meant for protecting pedestrians as they engage in roadway crossings. Sometimes, no infrastructure exists to protect pedestrians at all. In these and other scenarios, a common problem is the limited visibility with which drivers can see pedestrians in various traffic conditions. Improvements are needed to increase the visibility of pedestrians to drivers, in order to enhance safety.

BRIEF SUMMARY

Methods, apparatuses, and computer-readable media are disclosed for providing a mixed-reality scene involving a first vehicle and a second vehicle. According to at least one embodiment, at the second vehicle, in response to a pedestrian detection event at the first vehicle, a sequence of mixed-reality images is presented to a driver of the second vehicle, wherein at least one image in the sequence of mixed-reality images results from merging (a) an image captured by a camera aboard the first vehicle and (b) an image captured by a camera aboard the second vehicle, to generate a merged image. The merging may comprise de-emphasizing an occluded portion of the image captured by the camera aboard the second vehicle, the occluded portion corresponding to occlusion by the first vehicle, and emphasizing an unoccluded portion of the image captured by the camera aboard the first vehicle. The unoccluded portion of the image captured by the camera aboard the first vehicle may provide, in the merged image, visibility of a pedestrian at least partially blocked from a view of the driver of the second vehicle.

In one embodiment, the first vehicle is positioned in a first lane of a roadway, and the second vehicle is positioned behind the first vehicle in the first lane of the roadway. In another embodiment, the first vehicle is positioned in a first lane of a roadway, and the second vehicle is positioned in a second lane of the roadway different from the first lane. For example, the second lane may be adjacent to the first lane. In one embodiment, the first vehicle is positioned in a first roadway, and the pedestrian is positioned in the roadway in front of the first vehicle. In another embodiment, the first vehicle is positioned in a first roadway, and the pedestrian is positioned in a second roadway intersecting with the first roadway.

According to at least one embodiment, presenting the sequence of mixed-reality images to the driver of the second vehicle in response to the pedestrian detection event at the first vehicle may comprise (a) at the second vehicle, receiving data defining a region of potential pedestrian travel by the pedestrian across a roadway, (b) at the second vehicle, determining a projected path of vehicular travel for the second vehicle, (c) at the second vehicle, determining that the projected path of vehicular travel for the second vehicle intersects the region of potential pedestrian travel, and (d) presenting the sequence of mixed-reality images of the driver of the second vehicle.

In an embodiment, additional steps may be taken including (a) at the second vehicle, receiving data relating to camera availability at the first vehicle and (b) at the second vehicle, determining based on the data relating to camera availability at the first vehicle, that a view from the camera aboard the first vehicle would provide improved visibility of the pedestrian to the driver of the second vehicle. The sequence of mixed-reality images may be presented to the driver of the second vehicle in response to the determining that the view of the camera aboard the first vehicle would provide improved visibility of the pedestrian to the driver of the second vehicle.

For example, the determining, that the view of the camera aboard the first vehicle would provide improved visibility of the pedestrian to the driver of the second vehicle, may be based on determining whether there is sufficient overlap among (a) the view of the camera aboard the first vehicle, (b) a view of the camera aboard the second vehicle, and (c) the region of potential pedestrian travel.

In addition, a representation of the region of potential pedestrian travel by the pedestrian across the roadway may be presented to the driver of the second vehicle.

BRIEF DESCRIPTION OF THE DRAWINGS

FIG. 6 is a flow chart showing illustrative portions of a process for providing a mixed-reality scene in response to pedestrian detection involving a first vehicle and a second vehicle.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
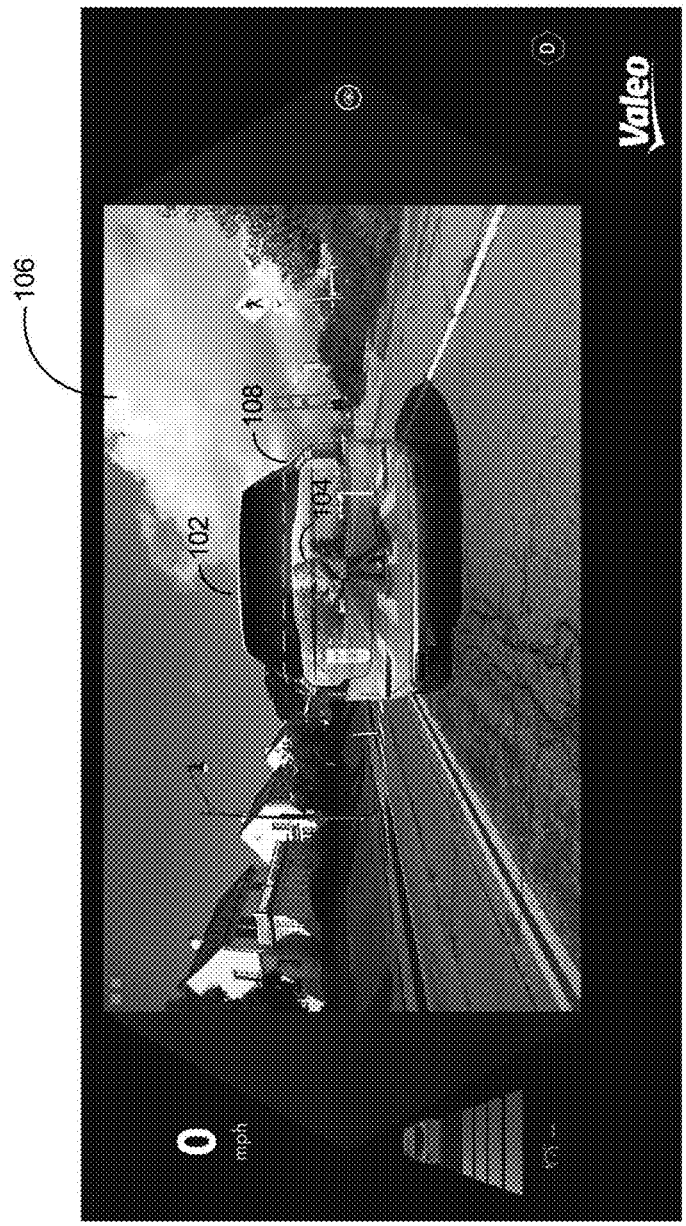
FIG. 1 illustrates a mixed-reality image presented to the driver of a following vehicle that simulates an ability to see through a lead vehicle.

FIG. 1 illustrates a mixed-reality image presented to the driver of a following vehicle that simulates an ability to see through a lead vehicle. Here, a lead vehicle 102 is stopped at a crosswalk. FIG. 1 shows the view from the perspective of the driver of the following vehicle (not shown), which is positioned directly behind the lead vehicle 102 and oriented in the same direction. Pedestrians 104 are crossing the crosswalk. However, in certain scenarios, the driver of the following vehicle cannot see pedestrians 104, because they are occluded, i.e., blocked from view, by the lead vehicle 102. This presents a potentially unsafe driving condition. For example, if the driver of the following vehicle does not realize that pedestrians 104 are crossing the crosswalk and becomes impatient, the driver of the following vehicle may attempt to drive around the lead vehicle, which can lead to a situation of possibly striking pedestrians 104. While FIG. 1 shows a situation in which pedestrians are occluded from view, other vehicles, animals, or other moving or still objects can also be occluded from view due to a lead vehicle. Unsafe situations caused by a lead vehicle blocking a following vehicle's view is not necessarily limited to crosswalks but may arise at other locations such parking lots, intersections, roadways, etc.

To address this and similar scenarios, a mixed-reality image 106 can be presented to the driver of the following vehicle to "see through" the lead vehicle. The mixed-reality image 106 can be presented on a display mounted in the dashboard of the following vehicle, integrated into the windshield of the following vehicle, implemented as a "heads-up" display of the following vehicle, etc. For example, the display may be a liquid crystal display (LCD), a head-up display (HUD), or other augmented reality (AR) display. The mixed-reality image 106 can be presented as a single image, e.g., a still frame, or as a part of a sequence of mixed-reality images that make up a video stream presented to the driver of the following vehicle. In various embodiments, the generation and presentation of the mixed-reality images is associated with minimal time lag, such that the video stream may be considered a live video stream and may be used by the driver of the following vehicle as an effective visual aid while driving.

Presentation of the mixed-reality image 106 to the driver of the following vehicle may be performed in response to a pedestrian detection event at the lead vehicle 102. Sensors aboard the lead vehicle 102, such as one or more cameras, Radio Detection and Ranging (RADAR) devices, ultrasonic devices, etc., may be employed to perform pedestrian detection. In one embodiment, pedestrian detection may be performed based on image analysis. For example, images captured by one or more cameras may be analyzed to detect presence of a pedestrian. Machine learning (ML) and other artificial intelligence techniques may be used. Training of ML systems may be performed prior to deployment, such that pedestrian detection can be performed using an already-trained system. In various embodiments, data from different types of sensors, e.g., cameras, RADAR devices, Light Detection and Ranging (LIDAR) devices, ultrasonic devices, etc., may be fused to be used in conjunction with one another for performing pedestrian detection. In response to detection of one or more pedestrian, such as pedestrians 104, at the lead vehicle 102, the mixed-reality image 106 may be presented to the driver of the following vehicle, to reveal the presence of the one or more pedestrians who otherwise may have been blocked from view.

The mixed-reality image 106 can be generated by merging an image captured from a camera aboard the lead vehicle 102 with an image captured from a camera aboard the following vehicle, to form a merged image. In various embodiments, the mixed-reality image 106 may include a see-through region 108. Outside the see-through region 108, the mixed-reality image 106 may simply be the same as the image captured by the camera aboard the following vehicle. Inside the see-through region 108, the mixed-reality image 106 may be formed by emphasizing an occluded portion of the image captured by the camera aboard the following vehicle and de-emphasizing an unoccluded portion of the image captured by the lead vehicle. The occluded portion of the image captured by the camera aboard the following vehicle may be a portion of the image that corresponds to occlusion by the lead vehicle. For example, the occluded portion may be defined as the area in the image occupied by the lead vehicle (or a part of such an area).

De-emphasizing and emphasizing may be performed in different ways. In the embodiment shown in FIG. 1, de-emphasizing and emphasizing is accomplished by blending the image captured by the camera aboard the following vehicle and the image captured by the camera aboard the lead vehicle. Such image blending may be performed using various digital compositing techniques. Just as an example, digital compositing using alpha blending may be implemented. Different portions of the image may be combined using different weights. Also, gradients may be used for the combining. For instance, in FIG. 1, the center region of the image may be associated with a first blending factor (e.g., a constant referred to as "alpha_1"), and the regions at the outer borders of the image may be associated with a second blending factor (e.g., a constant referred to as "alpha_2"). Just as an example, the blending factor may increase linearly from alpha_1 to alpha_2 between the center region and the regions at the outer borders of the image. In another embodiment, de-emphasizing and emphasizing is accomplished by simply replacing the occluded portion of the image captured by the camera aboard the following vehicle with the unoccluded portion of the image captured by the camera aboard the lead vehicle, to form the see-through region 108 of the merged image.

Figure 2:
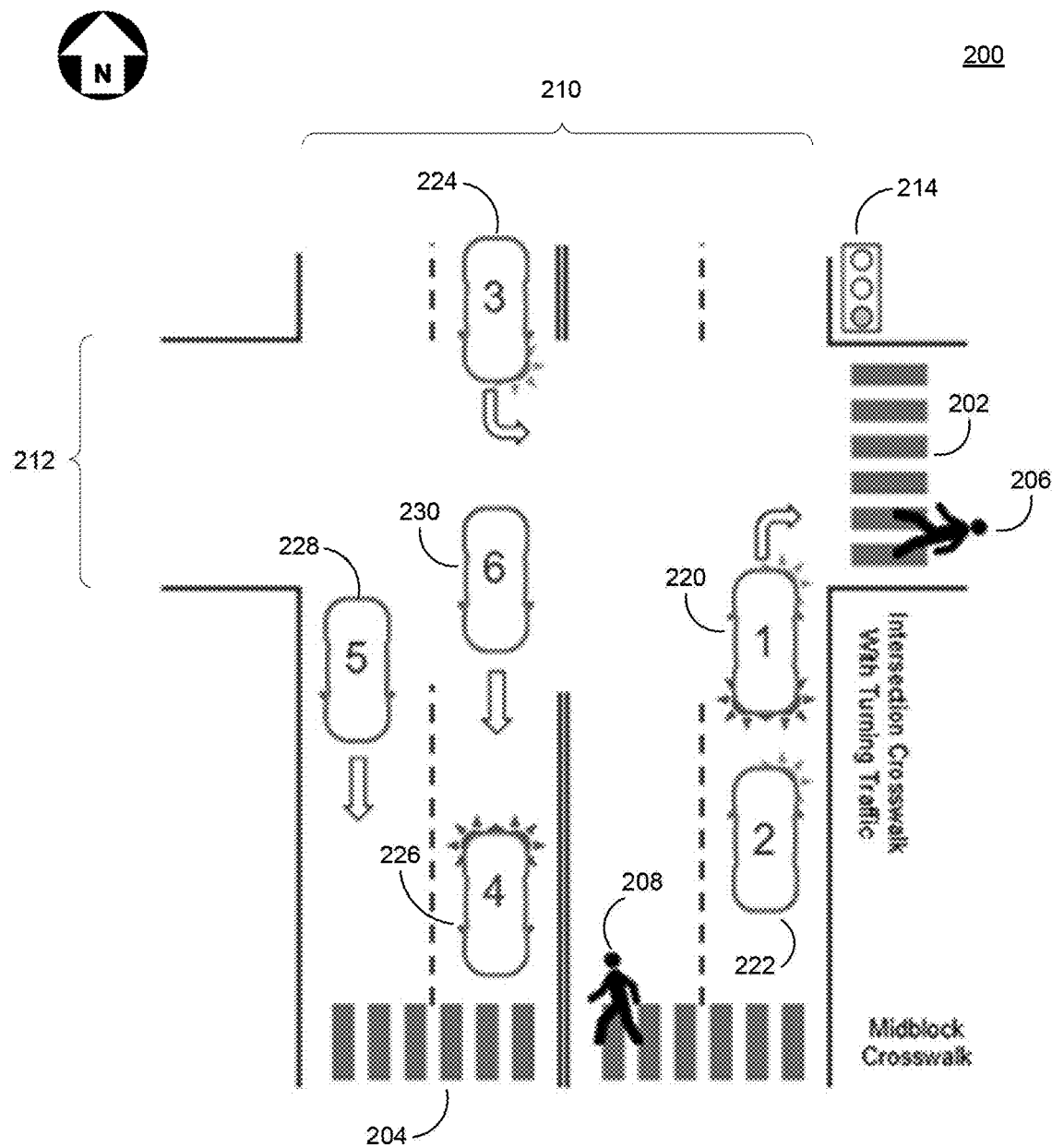
FIG. 2 presents a traffic scenario to illustrate two types of crosswalks, an "intersection crosswalk" with turning traffic and a "midblock crosswalk," according to embodiments of the present disclosure.

FIG. 2 presents a traffic scenario 200 to illustrate two types of crosswalks, an "intersection crosswalk" 202 with turning traffic and a "midblock crosswalk" 204, according to embodiments of the present disclosure. A pedestrian 206 is crossing the intersection crosswalk 202. A pedestrian 208 is crossing the midblock crosswalk 204. Here, the traffic scenario 200 is shown in the context of an intersection between a first roadway 210 running in a north-south orientation and a second roadway 212 running in an east-west orientation. A traffic signal 214 regulating traffic in the north-south orientation, in particular in the northbound direction, is also shown. A first vehicle 220, second vehicle 222, third vehicle 224, fourth vehicle 226, fifth vehicle 228, and sixth vehicle 230 are shown to illustrate certain limited vehicular visibility events that may endanger pedestrian safety.

First, referring to the "intersection crosswalk" 202, the first vehicle 220 may be approaching the intersection intending to making a right turn. However, the first vehicle 220 must stop for pedestrian 206, who is in the process of traversing crosswalk 202. The second vehicle 222, which is following the first vehicle 220, may be intending to also make a right turn. Alternatively, the second vehicle 222 may be intending to continue straight through the intersection. In either case, the driver of the second vehicle 222 may not be able to see pedestrian 206 through the first vehicle 220. In other words, the first vehicle 220 may be blocking pedestrian 206 from the view of the driver of the second vehicle 222.

This presents at least two types of dangers. First, the driver of the second vehicle 222 may not expect the first vehicle 220 to stop. After all, the signal light 214 controlling north bound traffic on roadway 210 is "green," indicating that northbound traffic is allowed to flow. For example, pedestrian 206 may suddenly step into crosswalk 202, and the driver of the first vehicle 220, intending to turn right but seeing pedestrian 206, may react by applying brakes suddenly. This creates a potentially dangerous condition in which the second vehicle 222 may collide with the first vehicle 220 in a "rear end" type collision. Even if no collision occurs, the driver of the second vehicle 222 may become irritated, not knowing the reason for the sudden braking by the first vehicle 220, and react in an unsafe or discourteous manner, such as by honking the horn. Be it a rear end collision or an unsafe or discourteous driver reaction, such an undesirable outcome may be averted if the driver of the second vehicle 222 can visually "see through" the first vehicle 220 to see pedestrian 206 and thus be able to either anticipate that the first vehicle 220 may be slowing down or stopping and/or be able to understand the reason why the first vehicle 220 is doing so. According to at least one embodiment, such a "see through" view may be presented to the driver of the second vehicle 222 in response to detection of pedestrian 206 by the first vehicle 220.

In addition, a third vehicle 224 may also pose a particular danger to pedestrian 206. As shown in the figure, the third vehicle 224, which is traveling southbound on roadway 210, is intending to make a left turn onto roadway 212. Studies have shown that in such a scenario, the driver can often over-focus on on-coming traffic and under-focus on pedestrians. Thus, pedestrian 206 is in danger of being the victim of a vehicle-pedestrian collision caused by the third vehicle 224. According to an embodiment of the disclosure, the first vehicle 220 may detect pedestrian 206 and broadcast a warning to alert nearby vehicles of the presence of pedestrian 206 in crosswalk 202. The driver of the third vehicle 224 may be one of the recipients of such a broadcast warning and, in response, may focus more on pedestrian 206 and avoid a potential vehicle-pedestrian collision.

Second, referring to the "midblock crosswalk" 204, the fourth vehicle 226 is traveling southbound on roadway 210 and approaching the midblock crosswalk 204. The driver of the fourth vehicle 226 sees pedestrian 208 and stops. However, the fourth vehicle 226 may block the view of pedestrian 208 from the perspective of the drivers of the fifth vehicle 228 and the sixth vehicle 230. This creates a dangerous situation for pedestrian 208. The driver of the fifth vehicle 228 may not understand why the fourth vehicle 226 is stopping and thus may drive the fifth vehicle 228 through the midblock crosswalk 204, potentially colliding with pedestrian 208. Similarly, the driver of the sixth vehicle may not understand why the fourth vehicle 226 is stopping and thus may become irritated and engage in unsafe or discourteous behavior. For example, the driver of the sixth vehicle 230 may honk the horn or attempt to change lanes to bypass the fourth vehicle 226 and drive through the midblock crosswalk 204, again potentially colliding with pedestrian 208. Such undesirable outcomes may be averted if the driver of the fifth vehicle 228 and/or the driver of the sixth vehicle 230 can visually "see through" the fourth vehicle 226 to see pedestrian 208 and thus be able to either anticipate that the fourth vehicle 226 may be slowing down or stopping and/or be able to understand the reason why the fourth vehicle 226 is doing so. According to at least one embodiment, such a "see through" view may be presented to the driver of the fifth vehicle 228 and/or the driver of the sixth vehicle 230 in response to detection of pedestrian 208 by the fourth vehicle 226.

Figure 3:
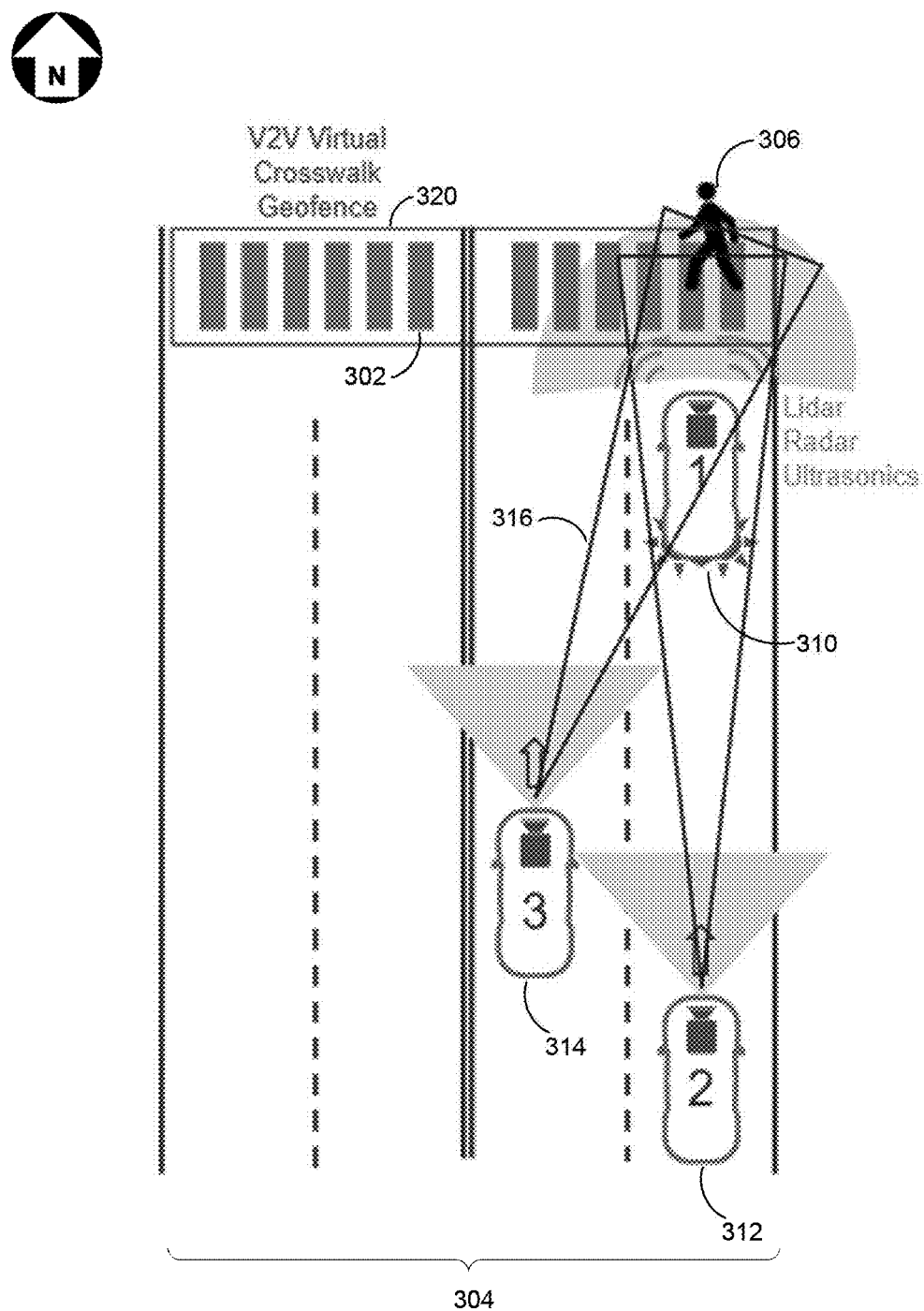
FIG. 3 illustrates the identification of a real or virtual crosswalk and detection of a pedestrian, as performed by one vehicle, in order to facilitate presentation of a see-through mixed reality view at another vehicle, according to various embodiments of the disclosure.

FIG. 3 illustrates the identification of a real or virtual crosswalk and detection of a pedestrian, as performed by one vehicle, in order to facilitate presentation of a see-through mixed reality view at another vehicle, according to various embodiments of the disclosure. In this figure, a real, physical crosswalk 302, e.g., in the form of painted stripes on the road surface, is installed across a roadway 304. A pedestrian 306 is traversing the physical crosswalk 302. A first vehicle 310, a second vehicle 312, and a third vehicle 314 are traveling northbound on the roadway 304. As the first vehicle 310 comes to a stop to allow pedestrian 306 to cross roadway 304, the first vehicle 310 may detect the presence of pedestrian 306, define a "virtual crosswalk" 320, and broadcast a message to nearby vehicles to identify the virtual crosswalk 320 and announce the presence of pedestrian 306 within the virtual crosswalk 320. Thus, a "virtual crosswalk" may be understood as a region of potential pedestrian travel by a pedestrian, such as pedestrian 306.

According to an embodiment, the virtual crosswalk 320 may be viewed as a "geofence," which may be defined within a coordinate system such as a Global Positioning System (GPS) coordinate system. Just as an example, the virtual crosswalk may be defined with reference to a center point, which may be identified using GPS coordinates. A rectangular shape and position of the geofence may then be defined by specifying a width, a length, and an orientation of the rectangle relative to the center point. The center point itself may be defined using absolute GPS coordinates. Alternatively, the center point may be defined relatively, such as being at a certain X and Y-axis offset from a known point, e.g., the known center point location of a particular roadway intersection on a map.

The message identifying the virtual crosswalk 320 and announcing the presence of pedestrian 306 may be broadcast directly from the first vehicle 310 to other vehicles, such as through vehicle-to-vehicle communication (V2V). Alternatively, such a message may be broadcast indirectly from the first vehicle 310 to the other vehicles, such as through a cloud server. The message serves to warn other vehicles nearby that a crosswalk has been identified, and a pedestrian has been detected, and thus available pedestrian safety measures may need to be performed at such other vehicles, such as displaying a sequence of mixed-reality images (e.g., mixed-reality image 106 shown in FIG. 1) to "see through" a vehicle such as vehicle 310 and make pedestrian 306 visible.

In addition, the first vehicle 310 may automatically enable a broadcast of a sequence of images captured by its forward looking camera(s). Other vehicles nearby, such as the second vehicle 312 and the third vehicle 314, may receive the video stream and use it to perform merger with images captured locally (i.e., at the second vehicle 312 and/or third vehicle 314) to obtain mixed-reality images to "see through" the first vehicle 310. The "see through" view may be an additional measure, on top of the message identifying the virtual crosswalk 320 and announcing the presence of pedestrian 306 (mentioned earlier), to emphasize the presence of pedestrian 306. The "see through" view allows the drivers of the second vehicle 312 and/or third vehicle 314 to visually perceive pedestrian 306 in the merged image, in a very direct way. This visual cue significantly enhances the likelihood that such a driver would become aware the presence of pedestrian 306.

Each vehicle that receives such broadcast messages may then decide to whether to react to the existence of the virtual crosswalk 320 and/or pedestrian 306. Such a decision may be based on a number of considerations, including the location of the virtual crosswalk 320 and the projected path of travel by the vehicle receiving the broadcast message. For example, if the third vehicle 314 receives such a message identifying virtual crosswalk 320 and pedestrian 306, the third vehicle 314 may determine whether its own projected path of travel intersects the virtual crosswalk 320. If so, the third vehicle 314 may decide to react in a number of ways. One reaction may be to visually display the virtual crosswalk 320 to the driver of the third vehicle 314. Another reaction may be to utilize the sequence of images broadcast from the first vehicle 310 and merge them with a sequence of images captured locally at the third vehicle 314, to generate a mixed-reality sequence of images that allows the driver of the third vehicle 314 to "see through" the first vehicle 310. A similar process of deciding when and how to react to the broadcast messages may take place at other nearby vehicles, such as the second vehicle 312.

Additionally, the decision at each vehicle that receives the broadcast message to react to the existence of the virtual crosswalk 320 and/or pedestrian 306 may also be based on a determination of whether the images captured by the camera(s) aboard the first vehicle 310 would actually help to improve visibility of the pedestrian from the perspective of the vehicle receiving the broadcast message. Continuing with the same example, the third vehicle 314 may receive a "camera availability" message from the first vehicle 310 indicating the position and orientation of the camera(s) aboard the first vehicle 310. The third vehicle 314, having knowledge of the position, orientation, and/or trajectory of (1) itself (third vehicle 314) and its front facing camera(s), (2) the first vehicle 310 and its front facing camera(s), and (3) the pedestrian 306, would be able to determine whether the view from the front camera(s) abroad the first vehicle 310 would provide improved visibility of pedestrian 306 to the driver of the third vehicle 314.

In one embodiment, the determination that the view of the camera aboard the first vehicle 310 would provide improved visibility of pedestrian 306 to the driver of the third vehicle 314 is based on determining whether there is sufficient overlap among (1) the view of the front facing camera(s) aboard the first vehicle 310, (2) the view of the front facing camera(s) aboard the third vehicle 314, and (3) the region of pedestrian travel, e.g., the virtual crosswalk 320. In a more specific embodiment, such a determination may also take into account the portion of view corresponding to occlusion by the first vehicle 310. Just as an example, a portion 316 of the view of the camera(s) aboard the third vehicle 314 may correspond to occlusion by the first vehicle 310. In other words, the portion 316 of the view of the camera(s) aboard the third vehicle 314 is blocked by the first vehicle 310. One illustrative determination is as follows. If (1) the portion 316 of the view of the front facing camera(s) of the third vehicle 314, (2) the view of the front facing camera(s) aboard the first vehicle 310, and (3) the virtual crosswalk 320 all intersect with one another to define an area of overlap that is sufficiently large (e.g., meets or exceeds a threshold size), then the determination may be made that the view from the front camera(s) abroad the first vehicle 310 would provide improved visibility of pedestrian 306 to the driver of the third vehicle 314.

According to an additional embodiment, different vehicle may "hand off" the responsibility of pedestrian monitoring and capturing of images used for "see through" views by other vehicles, as pedestrian 306 traverses the virtual crosswalk 320. For example, as the third vehicle 314 reaches the virtual crosswalk 320, the sensors aboard the third vehicle 314 may begin to detect pedestrian 306. The third vehicle 314 may then start broadcasting its own message identifying the virtual crosswalk 320 and announcing the presence of pedestrian 306. Steps may be taken to reconcile the virtual crosswalk identified by the first vehicle 310 and the virtual crosswalk identified by the third vehicle 314 as one in the same, i.e., the same virtual crosswalk. Similarly, steps may be taken to reconcile the pedestrian detected by the first vehicle 310 and the pedestrian detected by the third vehicle 314 as one in the same, i.e., the same pedestrian. Such reconciliation may be performed in the first vehicle 310, the third vehicle 314, and/or elsewhere such as at a cloud server. Finally, the third vehicle 314 may broadcast a sequence of images captured by its forward looking camera(s) which may then be used by other vehicles nearby to obtain mixed-reality images to "see through" the third vehicle 314. In this manner, as pedestrian 306 traverses the virtual crosswalk 320, over multiple lanes, multiple camera angles from different vehicles may become available for providing images of pedestrian 306 for use in generating "see through" views at nearby vehicles.

Furthermore, a virtual crosswalk (e.g., virtual crosswalk 320) may be established in the absence of a physical crosswalk (e.g., physical crosswalk 302). In some scenarios, a pedestrian may decide to cross a roadway at a location where there is no physical crosswalk. According to an embodiment of the disclosure, a vehicle may utilize its sensors, e.g., cameras, RADAR devices, ultrasonic devices, etc., to detect the presence of such a pedestrian crossing the roadway. Even in the absence of a physical crosswalk, the vehicle may establish a likely trajectory of travel by the pedestrian, based on the location and movement of the pedestrian. Using the likely trajectory of travel, the vehicle may establish a region of potential pedestrian travel across the roadway by the pedestrian, e.g., a virtual crosswalk. The vehicle may identify the virtual crosswalk and announce the presence of pedestrian using a broadcast message sent to nearby vehicles, as well as broadcast a sequence of images of the pedestrian to facilitate "see through" views at such other vehicles, in the same manner as described previously. This may be done even in the absence of a physical crosswalk.

Figure 4:
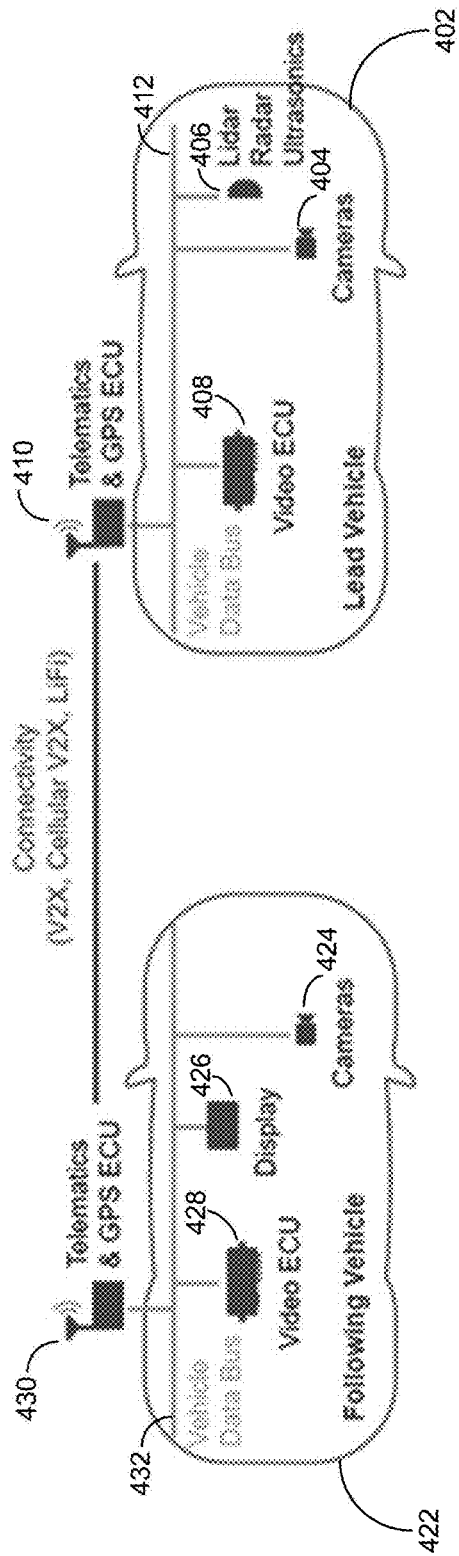
FIG. 4 presents an overview of various hardware components used to implement see-through mixed reality in response to pedestrian detection, according to an embodiment of the disclosure.

FIG. 4 presents an overview of various hardware components used to implement see-through mixed reality in response to pedestrian detection, according to an embodiment of the disclosure. In the context of the present disclosure, the terms "lead vehicle" and "following vehicle" are intended to be interpreted broadly. As used here, the lead vehicle corresponds to the vehicle that may be detect the presence of a pedestrian, broadcast various messages, such as those identifying a sidewalk and providing camera availability information, and/or serve as the source of a sequence of images captured of the pedestrian. The following vehicle corresponds to the vehicle that may receive such messages and/or image sequences and construct merged image sequences to provide a mixed-reality "see through" view to its driver. The following vehicle may be positioned directly behind the lead vehicle (e.g., as in the case of the second vehicle 312 being positioned directly behind the first vehicle 310 in FIG. 3). Alternatively, the following vehicle may be positioned at an offset location that is not directly behind the lead vehicle (e.g., as in the case of the third vehicle 314 being positioned in a different lane than the first vehicle 310 in FIG. 3).

Returning to FIG. 4, the figure shows a lead vehicle 402 and a following vehicle 422. Lead vehicle 402 may be equipped with various devices including one or more cameras 404, LIDAR, RADAR, and/or ultrasonic detectors 406, a video electronic control unit (ECU) 408, and a telematics and global positioning system (GPS) ECU 410, all coupled to a vehicle data bus 412. Following vehicle 422 may be equipped with various devices including one or more cameras 424, a display 426, a video ECU 428, and a telematics and GPS ECU 430, all coupled to a vehicle data bus 432. An ECU, such as the video ECU 408 or the telematics and GPS ECU 410, may comprise one or more processors executing code for performing programmed instructions for carrying out specific tasks described herein. An ECU may also incorporate hardware components such as video, communications, positioning (e.g., GPS) components to support various functionalities.

These components aboard the lead vehicle 402 and the following vehicle 422 may work together to communicate data and construct a mixed-reality scene, e.g., a "see-through" video stream, that is presented to the driver of the following vehicle 422. Cameras 404 aboard the lead vehicle 402 may provide a "see-through" view to the driver of the following vehicle 422, so that objects (e.g., pedestrians) in front of the vehicle that would otherwise be occluded from view can become visible. Aboard lead vehicle 402, the raw images from cameras 404 may be forwarded to the video ECU 408 over the vehicle data bus 412. Here, the video ECU 408 may select the appropriate camera view or stitch together views of several of the cameras 404, to form the images provided by the lead vehicle 402. As shown, the video ECU 408 is implemented as a separate device on the vehicle data bus 412. However, in alternative embodiments, the video ECU 408 may be part of one or more of the cameras 404 or integrated into the telematics and GPS ECU 410. Other alternative implementations are also possible for the components shown in FIG. 4.

Connectivity between the lead vehicle 402 and the following vehicle 422 may be provided by telematics and GPS ECU 410 aboard the lead vehicle 402 and the telematics and GPS ECU 430 aboard the following vehicle 422. For example, the images provided by the lead vehicle 402 may be forwarded over a vehicle-to-vehicle (V2V) communications link established between telematics and GPS ECUs 410 and 430. Different types of V2V links may be established, such as WLAN V2V (DSRC), cellular V2V, Li-Fi, etc. Also, connectivity between the lead vehicle 402 and the following vehicle 422 isn't necessarily restricted to V2V communications. Alternatively or additionally, the connectivity between the two vehicles may be established using vehicle-to-network (V2N) communications, e.g., forwarding data through an intermediate node, such a cloud server.

The LIDAR, RADAR, and/or ultrasonic detectors 406 aboard the lead vehicle 402 facilitate detection of objects such as a pedestrian. Image data from cameras 404, along with data from LIDAR and/or RADAR detectors 406, may be analyzed to detect presence of a pedestrian. Machine learning (ML) and other artificial intelligence techniques may be used. Training of ML systems may be performed prior to deployment, such that pedestrian detection can be performed using an already-trained system. In various embodiments, data from different types of sensors, e.g., cameras, RADAR devices, ultrasonic devices, etc., may be fused to be used in conjunction with one another for performing pedestrian detection. Such data processing and analysis may be performed by various processors, such as those implemented in video ECU 408 or telematics and GPS ECU 410.

At the following vehicle 422, similar components (e.g., one or more cameras 424, a video ECU 428, a telematics and GPS ECU 430, etc.) may be deployed. The video ECU 428 aboard the following vehicle 422 may perform the merger of the images from the lead vehicle 402 and the images from the following vehicle 422, to generate the see-through video stream. Finally the see-through video stream is presented to the driver of the following vehicle on the display 426.

Figure 5:
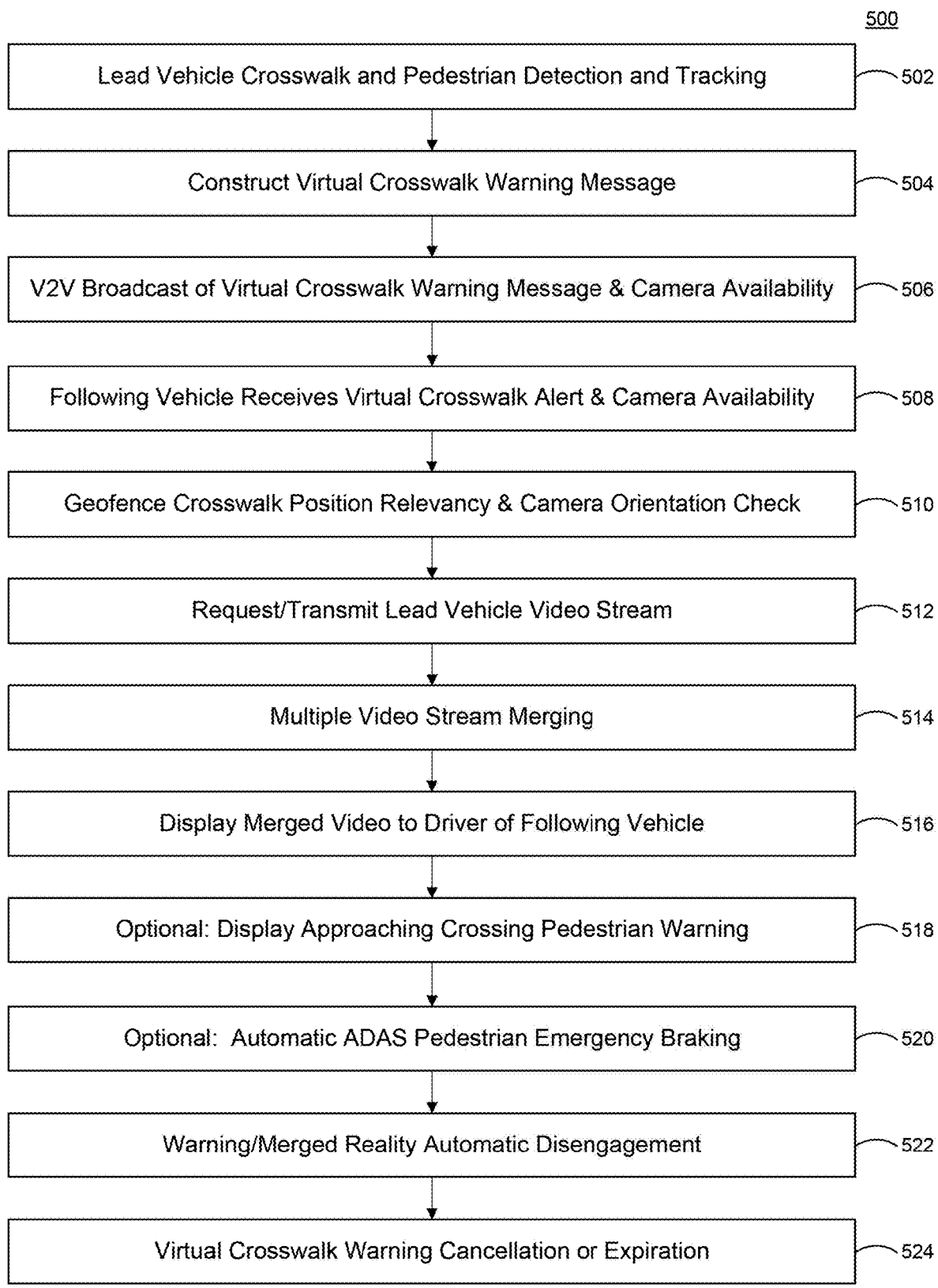
FIG. 5 is a flow chart showing detailed steps of a process for presenting a mixed-reality "see through" view in response to pedestrian detection, according to one or more specific embodiments of the present disclosure.

FIG. 5 is a flow chart showing detailed steps of a process 500 for presenting a mixed-reality "see through" view in response to pedestrian detection, according to one or more specific embodiments of the present disclosure. At a step 502, a lead vehicle performs crosswalk and pedestrian detection and tracking. The lead vehicle may use its various onboard sensors to detect the existence of a crosswalk, such as a physical crosswalk 302 shown in FIG. 3. The lead vehicle may also use its onboard sensors to detect the existence of a pedestrian within or waiting to cross the crosswalk. Alternatively, in the absence of a physical crosswalk, the lead vehicle may simply detect the existence of a pedestrian and determine an implied crosswalk (e.g., virtual crosswalk). Crosswalk detection may utilize one or more of the following resources:

1. Lead vehicle's navigation system may provide marked crosswalk GPS location.
2. Unmarked (implied) crosswalks may be derived from intersection data provided by lead vehicle's navigation system.
3. Lead vehicle's front camera(s) may use video scene processing algorithms to detect marked crosswalks and intersection boundaries (implied crosswalks).
4. Lead vehicle's front camera and/or LIDAR can detect lane boundary markings such as a marked crosswalk based on reflectance changes from the surrounding pavement.

Pedestrian detection and tracking may utilize one or more of the following resources:

1. Lead vehicle's front and/or surround view camera(s) may use video scene processing algorithms to detect pedestrians crossing the road or waiting on the side of the road at a marked crosswalk.
2. Lead vehicle's LIDAR/RADAR/Ultrasonic detectors may be used to detect pedestrians crossing in front of the vehicle, track them, and calculate their crossing speed. If the pedestrians are still on the corner or sidewalk and have yet to start crossing, the system can use an assumed walking speed, such as a nominal walking speed of 1.2 m/s (4.0 ft/s) or the most current recommendation in the current pedestrian walking speed data from the Federal Highway Administration's Manual of Uniform Traffic Control Devices (MUTCD).
3. Based on navigation data or scene analysis from the front cameras, the roadway width may be determined.
4. Based on the pedestrian position within the crossing, direction of travel, and movement speed, a time to clear the intersection may be computed.

At a step 504, the lead vehicle constructs a virtual crosswalk warning message. According to one embodiment, the virtual crosswalk warning message comprises three components: location, pedestrian detected, and estimated warning duration. Expected crossing duration refers to an amount of time that the pedestrian is expected to take in traversing the crosswalk. The expected crossing duration information may be useful to an approaching vehicle that is relatively far from the intersection. Such a vehicle may not be alerted about a pedestrian who will exit the crosswalk by the time the vehicle reaches the crosswalk.

The lead vehicle (e.g., the first vehicle 310 in FIG. 3) uses the data computed in Step 502 to construct a V2V message representing the following:
1. Location of the virtual crosswalk, expressed in GPS points defining the boundaries, creating what is essentially a virtual geofenced "enter with caution" zone.
2. The known or estimated pedestrian location within the virtual crosswalk.
3. Pedestrian direction of travel within the virtual crosswalk.
4. The estimated time that it will take any tracked pedestrians to cross the intersection.

At step 506, the lead vehicle broadcasts the V2V crosswalk warning message created in step 504. The lead vehicle also broadcasts or registers the availability of a camera system for viewing the pedestrian in the crosswalk. The virtual crosswalk and camera availability messages or records may include the following data:
Current time
Crosswalk location (GPS) and geofenced boundaries
Pedestrian location within the crosswalk
Pedestrian path or direction of the travel
Pedestrian speed
Estimated time that pedestrian will take to cross the road
Vehicle location (GPS)
Camera orientation (e.g., vehicle travel direction)
Vehicle information (length, width, height)
Which camera is currently viewing the crosswalk and tracking the pedestrians
Camera Information such as X, Y, and Z mounting location, direction pointed (such as front, rear, side), and lens information, such as field of view The V2V broadcast may occur using one or both of the options listed below:
1. Option 1: Either or both the pedestrian in the crosswalk warning & the camera availability messages could be broadcast over V2V. The broadcast could be a direct signal sent to other vehicles within range of the communication announcing the vehicle location and available camera services. This method would be used for nearby vehicles communicating over DSRC, LTE Direct, Li-Fi, or other direct Vehicle-to-Vehicle (V2V) communication channel.
2. Option 2: Alternatively, one or both of the above messages could be broadcast to a cloud based server using cellular (4G or 5G) technology. The server would aggregate vehicle locations and available camera services, allowing the data to be searched by cars that are not in direct vehicle-to-vehicle communication range. Following vehicles either poll the server or subscribe to push notifications of nearby events.

At step 508, the following vehicles (e.g., the second vehicle 312 and the third vehicle 314 in FIG. 3) receive the V2V virtual crosswalk alert message. The following vehicles may receive the message, for example, using their respective telematics and GPS ECU units. A device such as a Telematics Control Unit (TCU) or other ADAS processing unit onboard each following vehicle may then interpret data from the V2V virtual crosswalk alert message, as discussed below.

At a step 510, each of the following vehicles determines the relevancy of the received geofenced crosswalk position and camera availability information. For example, each of the second vehicle 312 and the third vehicle 314 in FIG. 3 may determine whether its trajectory will cross into the geofenced area, representing the temporary crosswalk, i.e., the virtual crosswalk 320, received from the V2V broadcast originating from the lead vehicle, e.g., the first vehicle 310.

If the geofenced crosswalk is in-path of the following vehicle, the TCU, "see-through" view system, and/or other ADAS processing unit(s) may determine whether the camera view from the lead vehicle would be useful the driver of the following vehicle. Such a determination may be made, for example, according to the following process:
1. The following vehicle processing unit compares the GPS position, heading, and camera direction of the lead vehicle with the GPS position, heading, and camera direction of the following vehicle, to determine whether there is sufficient overlap between the two camera fields of view.
2. The following vehicle then uses its forward sensor distance measurement sensor to determine if there are any vehicles that might be blocking the view of the actual crosswalk.
3. The following vehicle may use its forward sensors (RADAR, camera, LIDAR) to determine if, while approaching the crosswalk, there are stopped cars on either side.

If there are no vehicles blocking the following vehicle's view of the crosswalk, and there are no cars stopped in any of the adjacent lanes, then the driver of the following vehicle should have a clear view of the crosswalk. In such a situation, "see through" view may not be needed and thus may not be displayed to the driver of the following vehicle. However, according to at least one embodiment, if there are potential visual blockages between the following vehicle and the crosswalk, and there are camera overlapping camera views between the following vehicle and a camera-equipped lead vehicle, then a "see through" view may be displayed to the drive of the following vehicle.

At step 512, if lead vehicle (e.g., the first vehicle 310 in FIG. 3) is correctly positioned with an available front-facing camera, the following vehicle (e.g., the second vehicle 312 or third vehicle 314 in FIG. 3) may request the video from the appropriate lead vehicle camera. While the following steps describe an embodiment of a request-based transmission of video data, in other embodiments the lead vehicle may simply broadcast the relevant video data without a request from any following vehicle. Returning to a request-based scheme, illustrative steps may include:
1. The following vehicle ECU sends a video request message to the lead vehicle.
    Option 1: V2V-Based Video Request—the Telematics ECU of the following vehicle sends a direct request to the lead vehicle for its video stream.
    Option 2: Cloud-Based Video Request—the data on how to request the video stream (such as IP address) could be stored in the cloud along with the lead vehicle's GPS record.
2. The following and lead vehicles may negotiate optional parameters such as:
    Preferred communication channel
    Video quality/compression based on signal strength
    The lead vehicle may use information provided by the following vehicle to customize the video stream, such as cropping the image to reduce the required bandwidth
3. The lead vehicle ECU responds to the following vehicle with the desired video stream
4. The following vehicle ECU receives the remote vehicle's video stream At step 514, respective video streams from the lead vehicle and the following vehicle may be merged to generate the mixed-reality "see through" view that makes the pedestrian visible to the driver of the following vehicle. Based on the known following vehicle and lead vehicle camera information, the known GPS information regarding both vehicles, and the following vehicle sensor data (RADAR, LIDAR, camera based object tracking), the lead vehicle's camera stream is transformed using video synthesis techniques to appear as though the video was shot from the following vehicle's point of view. Then the lead vehicle's camera video stream may be overlaid on the following vehicle's camera stream to create a merged video that mixes the realities seen by both cameras. For example, the steps described in the context of FIG. 1 may be performed.

At step 516, the resulting merged video is displayed to the driver of the following vehicle. The resulting "mixed reality" merged video provides a view that is consistent with the following vehicle driver's point of view. The merged video may be displayed to the driver of the following vehicle on a user interface, which may include but is not limited to a liquid crystal display (LCD), heads-up display (HUD), augmented reality (AR) display, or any other type of display. The actual implementation of the user interface depicting the mixed reality view could take a number of different forms:

- The lead vehicle may be "disappeared" completely from the following vehicle's camera video;
- The lead vehicle may appear as a partially transparent object in the following vehicle's camera video;
- The lead vehicle may appear as only an outline in the following vehicle's camera scene;
- Using a dynamic video point of view transition, the following vehicle's camera image may "zoom in on" or appear to "fly through" the lead vehicle. This may give the driver the impression that the perspective has shifted from the following vehicle to that of the lead vehicle.

At optional step 518, a vehicle approaching a crosswalk, such as a following vehicle, may receive the virtual crosswalk warning message and react by displaying an alert to the driver. Such an alert would indicate to the driver that the vehicle is approaching a crossing pedestrian. The alert may include one or more of the following modalities or display elements:

- An auditory alert
- A haptic alert
- A visual pedestrian crossing alert
- A distance countdown to reaching the pedestrian crossing location
- A link or button to allow the driver to activate mixed-reality "see through" view
- Automatic activation of mixed-reality "see through" view At optional step 520, the detected presence of pedestrian may be used to trigger vehicle safety features such as collision warning and automatic emergency braking. Referring back to FIG. 3, a particularly dangerous scenario for pedestrian 306 is depicted. Pedestrian 306 is walking in front of the first vehicle 310, which is stopped. However, pedestrian 306 is about to walk out from being visually obscured by the first vehicle 310 into the adjacent lane, where the third vehicle 314 is approaching. The driver of the third vehicle 314 may not recognize the crosswalk and/or understand why the first vehicle 310 has stopped. Additionally, any sensors onboard the third vehicle 314 that may be used to detect pedestrian 306 may be blocked by the first vehicle 310. This represents a very dangerous set of circumstances for pedestrian 306. For example, the third vehicle 314 may combine (1) the broadcast information received in Step 508 regarding the location of pedestrian 306 within the crosswalk, direction of travel, and speed and (2) the third vehicle 314's own GPS location, direction of travel, and speed, in order to determine whether a collision between the third vehicle 314 and pedestrian 306 would be likely (e.g., above a certain threshold). If so, the warning to the driver issued in Step 518 may be upgraded, e.g., to automatic emergency braking, to avoid a collision with pedestrian 306. Thus, by triggering safety features aboard the third vehicle 314—such as collision warning and automatic emergency braking—based on the detection of pedestrian 306 (e.g., by using the virtual crosswalk warning message), the safety of pedestrian 306 vis-à-vis the third vehicle 314 can be greatly enhanced.

At step 522, at the following vehicle, both the virtual crosswalk warning and merged-reality "see through" view can be automatically disengaged once the pedestrian clears the crosswalk, according to one embodiment. Just as an example, both features may be automatically disabled if any of the following conditions are met:

1. The following vehicle and lead vehicle cameras become misaligned to the point that there is no longer sufficient overlap between the two camera views to accurately represent reality. This may happen, for example, if the following vehicle and the stopped lead vehicle are in different lanes, and the following vehicle pulls up into a position parallel to the lead vehicle. Eventually, the following vehicle's camera view will no longer contain the stopped lead vehicle.
2. If the following vehicle, through onboard sensors such as RADAR, LIDAR, cameras, or ultrasonics, detects any new objects between the following vehicle and the lead vehicle, such as pedestrians, motorcyclists, or bicyclists. In such a situation, the mixed-reality "see through" view should be disabled to prevent any objects between the vehicles from becoming hidden or obscured by "see through" view, which create a potential safety issue.

At step 524, the V2V virtual crosswalk warning message may be automatically cancelled under different scenarios, for example:

1. Once pedestrian(s) finish crossing the roadway as detected by the sensors onboard the lead vehicle, which is the vehicle that initiated the V2V virtual crosswalk warning message, the system may report that the pedestrian(s) have cleared the crosswalk and may stop broadcasting the V2V virtual crosswalk warning message.
2. It is possible that once the pedestrian(s) have passed the location of the lead vehicle, the driver of the lead vehicle may drive over the crosswalk, and/or the sensors on the lead vehicle may lose track of the pedestrian (s). In such a scenario, the system may have two options:
   a. If other equipped vehicles have reached the crosswalk, are tracking the same pedestrian(s), and are broadcasting the alert message, then the lead vehicle can simply stop broadcasting the message.
   b. If no other equipped vehicles are broadcasting the alert message, then the lead vehicle may continue broadcasting the alert message for the duration that it had estimated it would take the pedestrians to cross the road.

FIG. 6 is a flow chart showing illustrative portions of a process 600 for providing a mixed-reality scene in response to pedestrian detection involving a first vehicle and a second vehicle. According to a step 602, at the second vehicle, in response to a pedestrian detection event at the first vehicle, a sequence of mixed-reality images is presented to a driver of the second vehicle, wherein at least one image in the sequence of mixed-reality images results from merging (a) an image captured by a camera aboard the first vehicle and (b) an image captured by a camera aboard the second vehicle, to generate a merged image. According to a step 604, the merging comprises de-emphasizing an occluded portion of the image captured by the camera aboard the second vehicle, the occluded portion corresponding to occlusion by the first vehicle, and emphasizing an unoccluded portion of the image captured by the camera aboard the first vehicle. According to a step 606, the unoccluded portion of the image captured by the camera aboard the first vehicle provides, in the merged image, visibility of a pedestrian at least partially blocked from a view of the driver of the second vehicle.

Figure 7:
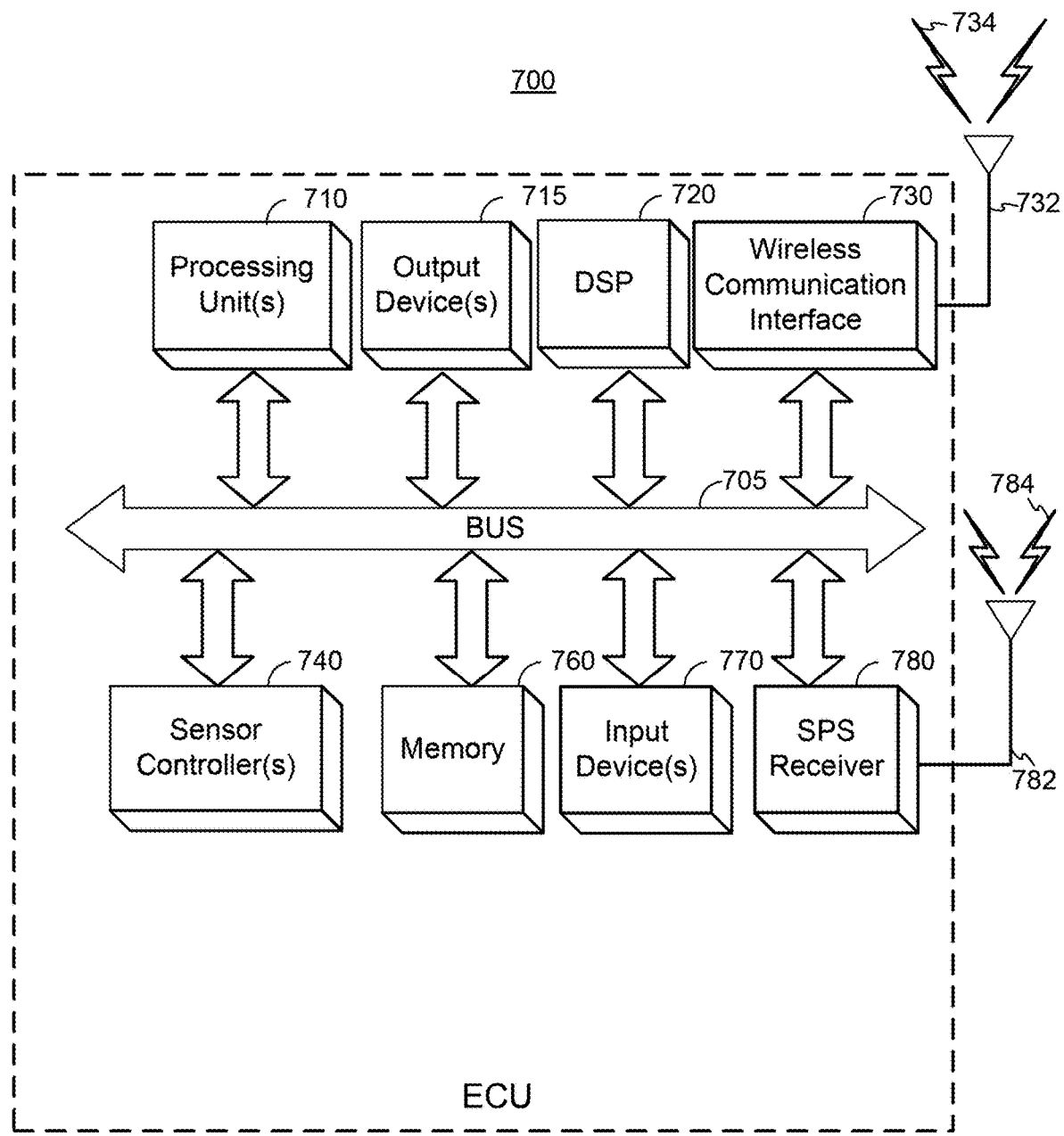
FIG. 7 is a block diagram of internal components of an example of an electronic control unit (ECU) that may be implemented according to an embodiment.

FIG. 7 is a block diagram of internal components of an example of an electronic control unit (ECU) that may be implemented according to an embodiment. For instance, ECU 700 may represent an implementation of a telematics and GPS ECU or a video ECU, discussed previously. It should be noted that FIG. 7 is meant only to provide a generalized illustration of various components, any or all of which may be utilized as appropriate. It can be noted that, in some instances, components illustrated by FIG. 7 can be localized to a single physical device and/or distributed among various networked devices, which may be disposed at different physical locations.

The ECU 700 is shown comprising hardware elements that can be electrically coupled via a bus 705 (or may otherwise be in communication, as appropriate). The hardware elements may include a processing unit(s) 710 which can include without limitation one or more general-purpose processors, one or more special-purpose processors (such as digital signal processing (DSP) chips, graphics acceleration processors, application specific integrated circuits (ASICs), and/or the like), and/or other processing structure or means. Some embodiments may have a separate DSP 720, depending on desired functionality. The ECU 700 also can include one or more input device controllers 770, which can control without limitation an in-vehicle touch screen, a touch pad, microphone, button(s), dial(s), switch(es), and/or the like; and one or more output device controllers 715, which can control without limitation a display, light emitting diode (LED), speakers, and/or the like.

The ECU 700 might also include a wireless communication interface 730, which can include without limitation a modem, a network card, an infrared communication device, a wireless communication device, and/or a chipset (such as a Bluetooth device, an IEEE 802.11 device, an IEEE 802.16.4 device, a WiFi device, a WiMax device, cellular communication facilities including 4G, 5G, etc.), and/or the like. The wireless communication interface 730 may permit data to be exchanged with a network, wireless access points, other computer systems, and/or any other electronic devices described herein. The communication can be carried out via one or more wireless communication antenna(s) 732 that send and/or receive wireless signals 734.

Depending on desired functionality, the wireless communication interface 730 can include separate transceivers to communicate with base transceiver stations (e.g., base stations of a cellular network) and/or access point(s). These different data networks can include various network types. Additionally, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on, including 4G and 5G technologies.

The ECU 700 can further include sensor controller(s) 740. Such controllers can control, without limitation, one or more accelerometer(s), gyroscope(s), camera(s), RADAR device (s), LIDAR device(s), ultrasonic sensor(s), magnetometer (s), altimeter(s), microphone(s), proximity sensor(s), light sensor(s), and the like.

Embodiments of the ECU 700 may also include a Satellite Positioning System (SPS) receiver 780 capable of receiving signals 784 from one or more SPS satellites using an SPS antenna 782. The SPS receiver 780 can extract a position of the device, using conventional techniques, from satellites of an SPS system, such as a global navigation satellite system (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 780 can be used various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The ECU 700 may further include and/or be in communication with a memory 760. The memory 760 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 760 of the ECU 700 can also comprise software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method for providing a mixed-reality scene involving a first vehicle and a second vehicle, comprising:
at the second vehicle, in response to a pedestrian detection event at the first vehicle, presenting a sequence of mixed-reality images to a driver of the second vehicle, wherein at least one image in the sequence of mixed-reality images results from merging (a) an image captured by a camera aboard the first vehicle and (b) an image captured by a camera aboard the second vehicle, to generate a merged image;
at the second vehicle, receiving data relating to camera availability at the first vehicle;
at the second vehicle, determining based on the data relating to camera availability at the first vehicle, that a view from the camera aboard the first vehicle would provide improved visibility of the pedestrian to the driver of the second vehicle,
wherein the sequence of mixed-reality images is presented to the driver of the second vehicle in response to the determining that the view of the camera aboard the first vehicle would provide improved visibility of the pedestrian to the driver of the second vehicle,
wherein the determining, that the view of the camera aboard the first vehicle would provide improved visibility of the pedestrian to the driver of the second vehicle, is based on determining whether there is sufficient overlap among (a) the view of the camera aboard the first vehicle, (b) a view of the camera aboard the second vehicle, and (c) the region of potential Pedestrian travel,
wherein the merging comprises de-emphasizing an occluded portion of the image captured by the camera aboard the second vehicle, the occluded portion corresponding to occlusion by the first vehicle, and emphasizing an unoccluded portion of the image captured by the camera aboard the first vehicle,
wherein the unoccluded portion of the image captured by the camera aboard the first vehicle provides, in the merged image, visibility of a pedestrian at least partially blocked from a view of the driver of the second vehicle, and
wherein presenting the sequence of mixed-reality images to the driver of the second vehicle in response to the pedestrian detection event at the first vehicle comprises:
at the second vehicle, receiving data defining a region of potential pedestrian travel by the pedestrian across a roadway;
at the second vehicle, determining a projected path of vehicular travel for the second vehicle;
at the second vehicle, determining that the projected path of vehicular travel for the second vehicle intersects the region of potential pedestrian travel; and
presenting the sequence of mixed-reality images of the driver of the second vehicle.

2. The method of claim 1, wherein the first vehicle is positioned in a first lane of a roadway, and the second vehicle is positioned behind the first vehicle in the first lane of the roadway.

3. The method of claim 1, wherein the first vehicle is positioned in a first lane of a roadway, and the second vehicle is positioned in a second lane of the roadway different from the first lane.

4. The method of claim 3, wherein the second lane is adjacent to the first lane.

5. The method of claim 1, wherein the first vehicle is positioned in a first roadway, and the pedestrian is positioned in the first roadway in front of the first vehicle.

6. The method of claim 1, wherein the first vehicle is positioned in a first roadway, and the pedestrian is positioned in a second roadway intersecting with the first roadway.

7. The method of claim 1, further comprising:
presenting a representation of the region of potential pedestrian travel by the pedestrian across the roadway to the driver of the second vehicle.

8. An apparatus for providing a mixed-reality scene involving a first vehicle and a second vehicle, comprising:
an electronic control unit (ECU); and
a display,
wherein the ECU is configured to, in response to a pedestrian detection event at the first vehicle, control the display to present a sequence of mixed-reality images to a driver of the second vehicle, wherein at least one image in the sequence of mixed-reality images results from merging (a) an image captured by a camera aboard the first vehicle and (b) an image captured by a camera aboard the second vehicle, to generate a merged image,
wherein the ECU is further configured to control the display to present the sequence of mixed-reality images in response to a pedestrian detection event at the first vehicle by:
at the second vehicle, receiving data relating to camera availability at the first vehicle;
at the second vehicle, determining based on the data relating to camera availability at the first vehicle, that a view from the camera aboard the first vehicle would provide improved visibility of the pedestrian to the driver of the second vehicle; and
wherein the sequence of mixed-reality images is presented to the driver of the second vehicle in response to the determining that the view of the camera aboard the first vehicle would provide improved visibility of the pedestrian to the driver of the second vehicle,
wherein the determining, that the view of the camera aboard the first vehicle would provide improved visibility of the pedestrian to the driver of the second vehicle, is based on determining whether there is sufficient overlap among (a) the view of the camera aboard the first vehicle, (b) a view of the camera aboard the second vehicle, and (c) the region of potential pedestrian travel,
wherein the merging comprises de-emphasizing an occluded portion of the image captured by the camera aboard the second vehicle, the occluded portion corresponding to occlusion by the first vehicle, and emphasizing an unoccluded portion of the image captured by the camera aboard the first vehicle, and
wherein the unoccluded portion of the image captured by the camera aboard the first vehicle provides, in the merged image, visibility of a pedestrian at least partially blocked from a view of the driver of the second vehicle, and
wherein the ECU is configured to control the display to present the sequence of mixed-reality images in response to a pedestrian detection event at the first vehicle by:
at the second vehicle, receiving data defining a region of potential pedestrian travel by the pedestrian across a roadway;
at the second vehicle, determining a projected path of vehicular travel for the second vehicle;
at the second vehicle, determining that the projected path of vehicular travel for the second vehicle intersects the region of potential pedestrian travel; and
controlling the display to present the sequence of mixed-reality images of the driver of the second vehicle.

9. The apparatus of claim 8, wherein the ECU is configured to control the display to present the sequence of mixed-reality images to the driver of the second vehicle while the first vehicle is positioned in a first lane of a roadway, and the second vehicle is positioned behind the first vehicle in the first lane of the roadway.

10. The apparatus of claim 8, wherein the ECU is configured to control the display to present the sequence of mixed-reality images to the driver of the second vehicle while the first vehicle is positioned in a first lane of a roadway, and the second vehicle is positioned in a second lane of the roadway different from the first lane.

11. The apparatus of claim 8, wherein the ECU is configured to control the display to present the sequence of mixed-reality images to the driver of the second vehicle while the first vehicle is positioned in a first roadway, and the pedestrian is positioned in the roadway in front of the first vehicle.

12. The apparatus of claim 8, wherein the ECU is configured to control the display to present the sequence of mixed-reality images to the driver of the second vehicle while the first vehicle is positioned in a first roadway, and the pedestrian is positioned in a second roadway intersecting with the first roadway.

13. The apparatus of claim 8 wherein the ECU is further configured to control the display to present a representation of the region of potential pedestrian travel by the pedestrian across the roadway to the driver of the second vehicle.

14. A non-transitory computer-readable storage medium containing instructions that, when executed by one or more processors of a computer, cause the one or more processors to provide a mixed-reality scene involving a first vehicle and a second vehicle by performing the following:
at the second vehicle, in response to a pedestrian detection event at the first vehicle, control display of a sequence of mixed-reality images to a driver of the second vehicle, wherein at least one image in the sequence of mixed-reality images results from merging (a) an image captured by a camera aboard the first vehicle and (b) an image captured by a camera aboard the second vehicle, to generate a merged image,
at the second vehicle, receive data relating to camera availability at the first vehicle;
at the second vehicle, determine based on the data relating to camera availability at the first vehicle, that a view from the camera aboard the first vehicle would provide improved visibility of the pedestrian to the driver of the second vehicle,
wherein the sequence of mixed-reality images is presented to the driver of the second vehicle in response to the determining that the view of the camera aboard the first vehicle would provide improved visibility of the pedestrian to the driver of the second vehicle,
wherein the determining, that the view of the camera aboard the first vehicle would provide improved visibility of the pedestrian to the driver of the second vehicle, is based on determining whether there is sufficient overlap among (a) the view of the camera aboard the first vehicle, (b) a view of the camera aboard the second vehicle, and (c) the region of potential pedestrian travel,
wherein the merging comprises de-emphasizing an occluded portion of the image captured by the camera aboard the second vehicle, the occluded portion corresponding to occlusion by the first vehicle, and emphasizing an unoccluded portion of the image captured by the camera aboard the first vehicle, and
wherein the unoccluded portion of the image captured by the camera aboard the first vehicle provides, in the merged image, visibility of a pedestrian at least partially blocked from a view of the driver of the second vehicle, and
wherein presenting the sequence of mixed-reality images to the driver of the second vehicle in response to the pedestrian detection event at the first vehicle comprises:
at the second vehicle, receiving data defining a region of potential pedestrian travel by the pedestrian across a roadway;

at the second vehicle, determining a projected path of vehicular travel for the second vehicle;

at the second vehicle, determining that the projected path of vehicular travel for the second vehicle intersects the region of potential pedestrian travel; and presenting the sequence of mixed-reality images of the driver of the second vehicle.

\* \* \* \* \*